US010242272B2

(12) United States Patent
Spampinato et al.

(10) Patent No.: US 10,242,272 B2
(45) Date of Patent: Mar. 26, 2019

(54) METHOD FOR ADVANCED AND LOW COST CROSS TRAFFIC ALERT, RELATED PROCESSING SYSTEM, CROSS TRAFFIC ALERT SYSTEM AND VEHICLE

(71) Applicant: STMicroelectronics S.r.l., Agrate Brianza (IT)

(72) Inventors: Giuseppe Spampinato, Catania (IT); Salvatore Curti, Catania (IT); Nunziata Ivana Guarneri, Caltanissetta (IT); Arcangelo Ranieri Bruna, Giardini Naxos (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 50 days.

(21) Appl. No.: 15/471,138

(22) Filed: Mar. 28, 2017

(65) Prior Publication Data

US 2018/0082132 A1    Mar. 22, 2018

(30) Foreign Application Priority Data

Sep. 21, 2016    (IT) .......................... 102016000094858

(51) Int. Cl.
*G06K 9/00*    (2006.01)
*G06K 9/46*    (2006.01)
(Continued)

(52) U.S. Cl.
CPC ..... *G06K 9/00791* (2013.01); *G06K 9/00335* (2013.01); *G06K 9/00805* (2013.01);
(Continued)

(58) Field of Classification Search
CPC ........... G06K 9/00805; G06K 9/00798; G06K 9/00791; G06K 9/3241; G06K 9/00335;
(Continued)

(56) References Cited

U.S. PATENT DOCUMENTS 5,777,690 A    7/1998  Takeda et al.
5,991,428 A  * 11/1999  Taniguchi ............ G06K 9/3241
                                                  348/155

(Continued)

OTHER PUBLICATIONS

Ikuro, Sato et al: "Crossing Obstacle Detection With a Vehicle-Mounted Camera," Intelligent Vehicles Symposium (VI), IEEE, Jun. 5, 2011, pp. 60-65, XP031998914.

(Continued)

*Primary Examiner* — Michael S Osinski
(74) *Attorney, Agent, or Firm* — Crowe & Dunlevy

(57) ABSTRACT

A sequence of images obtained by a camera mounted on a vehicle is processed in order to generate Optical Flow data including a list of Motion Vectors being associated with respective features in the sequence of images. The Optical Flow data is analyzed to calculate a Vanishing Point by calculating the mean point of all intersections of straight lines passing through motion vectors lying in a road. An Horizontal Filter subset is determined taking into account the Vanishing Point and a Bound Box list from a previous frame in order to filter from the Optical Flow the horizontal motion vectors. The subset of Optical Flow is clustered to generate the Bound Box list retrieving the moving objects in a scene. The Bound Box list is sent to an Alert Generation device and an output video shows the input scene where the detected moving objects are surrounded by a Bounding Box.

11 Claims, 4 Drawing Sheets

(51) Int. Cl.
   *G06K 9/62*     (2006.01)
   *G08G 1/0962*   (2006.01)
(52) U.S. Cl.
   CPC .............. *G06K 9/46* (2013.01); *G06K 9/6218* (2013.01); *G08G 1/09626* (2013.01); *G06K 2009/4666* (2013.01)
(58) Field of Classification Search
   CPC .............. G06K 9/00342; G06K 9/4604; G06K 9/00664; G06K 9/00818; G06K 9/00825; G06K 9/46; G06K 9/6218; G08G 1/165–1/168; G08G 1/09626; G06T 2207/30261; G06T 2207/10016; G06T 2207/30241; G06T 2207/30252; G06T 7/215; G06T 7/246; G06T 7/20
   See application file for complete search history.

(56) References Cited

U.S. PATENT DOCUMENTS

| | | | | |
|---|---|---|---|---|
| 6,501,794 | B1* | 12/2002 | Wang | H04N 19/17 348/699 |
| 6,594,583 | B2* | 7/2003 | Ogura | G08G 1/166 340/435 |
| 7,248,718 | B2* | 7/2007 | Comaniciu | G06K 9/00805 340/937 |
| 7,266,220 | B2* | 9/2007 | Sato | G06K 9/00805 340/937 |
| 7,437,243 | B2* | 10/2008 | Fujimoto | G06T 7/20 340/436 |
| 7,437,244 | B2* | 10/2008 | Okada | G06K 9/00805 348/155 |
| 7,612,800 | B2* | 11/2009 | Okada | G06T 7/248 348/169 |
| 7,639,841 | B2* | 12/2009 | Zhu | G06K 9/00335 340/435 |
| 8,812,226 | B2* | 8/2014 | Zeng | G01S 13/723 382/103 |
| 8,964,034 | B2* | 2/2015 | Nagamine | B60R 1/00 348/148 |
| 8,977,060 | B2* | 3/2015 | Dollar | G06K 9/00711 348/E5.065 |
| 9,420,151 | B2* | 8/2016 | Yokota | H04N 5/2254 |
| 9,443,163 | B2* | 9/2016 | Springer | G06K 9/4604 |
| 9,460,354 | B2* | 10/2016 | Fernandez | G06K 9/00805 |
| 9,664,789 | B2* | 5/2017 | Rosenblum | G01S 13/931 |
| 9,734,404 | B2* | 8/2017 | Dollar | G06K 9/00711 |
| 9,944,317 | B2* | 4/2018 | Lee | B62D 15/0265 |
| 2001/0012982 | A1* | 8/2001 | Ogura | G08G 1/166 701/301 |
| 2002/0042668 | A1* | 4/2002 | Shirato | G06K 9/00798 701/1 |
| 2003/0210807 | A1* | 11/2003 | Sato | G06K 9/00805 382/104 |
| 2003/0235327 | A1* | 12/2003 | Srinivasa | G06K 9/3241 382/104 |
| 2004/0057599 | A1* | 3/2004 | Okada | G06K 9/00805 382/103 |
| 2006/0171563 | A1* | 8/2006 | Takashima | G01C 21/28 382/104 |
| 2006/0177099 | A1* | 8/2006 | Zhu | G06K 9/00335 382/104 |
| 2008/0306666 | A1 | 12/2008 | Zeng et al. | |
| 2010/0097455 | A1* | 4/2010 | Zhang | G06K 9/00798 348/119 |
| 2010/0098295 | A1* | 4/2010 | Zhang | G06K 9/00798 382/103 |
| 2010/0104199 | A1* | 4/2010 | Zhang | G06K 9/00798 382/199 |
| 2010/0191391 | A1* | 7/2010 | Zeng | G01S 13/723 701/1 |
| 2010/0201508 | A1 | 8/2010 | Green et al. | |
| 2011/0133917 | A1 | 6/2011 | Zeng | |
| 2012/0133769 | A1* | 5/2012 | Nagamine | B60R 1/00 348/148 |
| 2013/0250109 | A1* | 9/2013 | Yokota | H04N 5/2254 348/148 |
| 2013/0286205 | A1* | 10/2013 | Okada | H04N 7/18 348/148 |
| 2014/0015693 | A1 | 1/2014 | Komoguchi et al. | |
| 2014/0334675 | A1* | 11/2014 | Chu | G06T 7/292 382/103 |
| 2014/0341474 | A1* | 11/2014 | Dollar | G06K 9/00711 382/197 |
| 2015/0234045 | A1* | 8/2015 | Rosenblum | G01S 13/931 342/71 |
| 2015/0332114 | A1* | 11/2015 | Springer | G06K 9/4604 348/148 |
| 2016/0073062 | A1* | 3/2016 | Ohsugi | G06K 9/00791 348/148 |
| 2016/0339959 | A1* | 11/2016 | Lee | B62D 15/0265 |

OTHER PUBLICATIONS

Lefaix, G. et al: "Motion-Based Obstacle Detection and Tracking for Car Driving Assistance," Pattern Recognition, 2002, Proceedings, 16th Internatioal Conference on Quebec City, Que., Canada Aug. 11-15, 2002, Los Alamitos, CA, US, IEEE Comput. Soc. US, vol. 4, Aug. 11, 2002, pp. 74-77, XP010613474.

Yamaguchi, K et al: "Moving Obstacle Detection Using Monocular Vision," 2006 IEEE Intelligent Vehicles Symposium : Meguro-ku, Japan, Jun. 13-15, 2006, IEEE, Piscataway, NJ, US, Jun. 13, 2006, pp. 288-293, XP010937028.

Italian Search Report and Written Opinion for IT 201600094858 dated May 30, 2017 (9 pages).

Aung, Thanda et al: "Video Based Lane Departure Warning System Using Hough Transform," International Conference on Advances in Engineering and Technology (ICAET'2014) Mar. 29-30, 2014 Singapore, pp. 85-88.

Balisavira, V., et al: "Real-Time Object Detection by Road Plane Segmentation Technique for ADAS," 2012 Eighth International Conference on Signal Image Technology and Internet Based Systems, 2012 IEEE, pp. 161-167.

Choudhary, Akash, et al: "Design and Implementation of Wireless Security System in Vehicle," International Journal of Innovative Research in Computer and Communication Engineering, vol. 3, Issue 7, Jul. 2015, pp. 6623-6629.

Cui, Jianzhu et al: "Vehicle Localisation Using a Single Camera," 2010 IEEE Intelligent Vehicles Symposium, University of California, San Diego, Jun. 21-24, 2010, pp. 871-876.

Dagan, Erez, et al: "Forward Collision Warning with a Single Camera," 2004 IEEE Intelligent Vehicles Symposium, University of Parma, Italy, Jun. 14-17, 2004, pp. 37-42.

Deng, Yao, et al: "An Integrated Forward Collision Warning System Based on Monocular Vision," Proceedings of the 2014 IEEE, International Conference on Robitics and Biomimetics, Dec. 5-10, 2014 Bali, Indonesia, pp. 1219-1223.

Jeong, Seongkyun, et al: "Design Analysis of Precision Navigation System," 2012 12th International Conference on Control, Automation and Systems, Oct. 17-21, 2012, in ICC, Jeju Island, Korea, pp. 2079-2082.

Jheng, Yu-Jie, et al: "A Symmetry-Based Forward Vehicle Detection and Collision Warning System on Android Smartphone," 2015 International Conference on Consumer Electronics—Taiwan (ICCE-TW), 2015 IEEE, pp. 212-213.

Reimer, Bryan, et al: "An Evaluation of Driver Reactions to New Vehicle Parking Assist Technologies Developed to Reduce Driver Stress," MIT Agelab, Nov. 4, 2010, pp. 1-26.

Salari, E., et al: "Camera-Based Forward Collision and Lane Departure Warning Systems Using SVM," 2013 IEEE, pp. 1278-1281.

Shakouri, Payman, et al: "Adaptive Cruise Control System Using Balance-Based Adaptive Control Technique," 2012 IEEE, pp. 510-515.

(56) References Cited

OTHER PUBLICATIONS

Stocker, Alan A., et al: "Analog Integrated 2-D Optical Flow Sensor With Programmable Pixels," 2004 IEEE, pp. III-9 through III-12.
Tan, Robert: "A Safety Concept for Camera Based ADAS Based on MultiCore MCU," 2014 IEEE International Conference on Vehicular Electronics and Safety (ICVES), Dec. 16-17, 2014, Hyderabad, India, pp. 1-6.
Thomanek, Jan, et al: "A New Pixel-Based Fusion Framework to Enhance Object Detection in Automotive Applications," 17th International Conference on Information Fusion (FUSION), Jul. 7-10, 2014 (8 pages).
Wu, Bing-Fei, et al: Research Article—"A Real-Time Embedded Blind Spot Safety Assistance System," International Journal of Vehicular Technology, vol. 2012, Article ID 506235 (15 pages).

\* cited by examiner

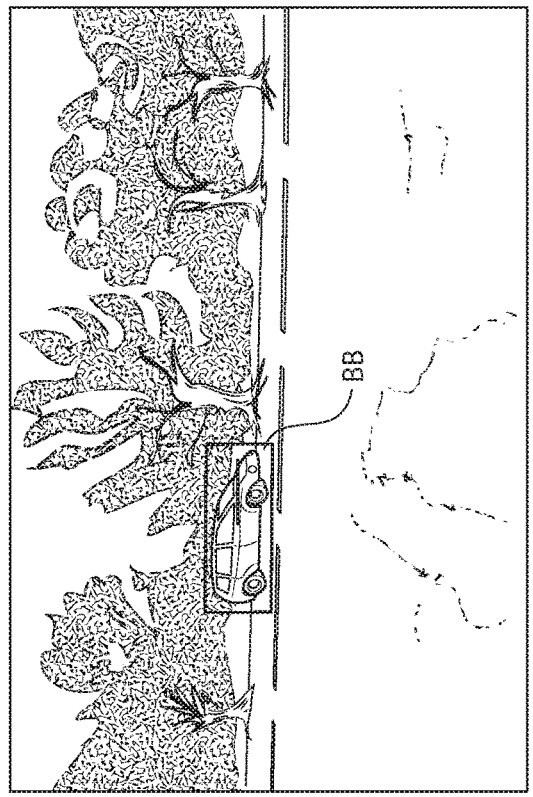
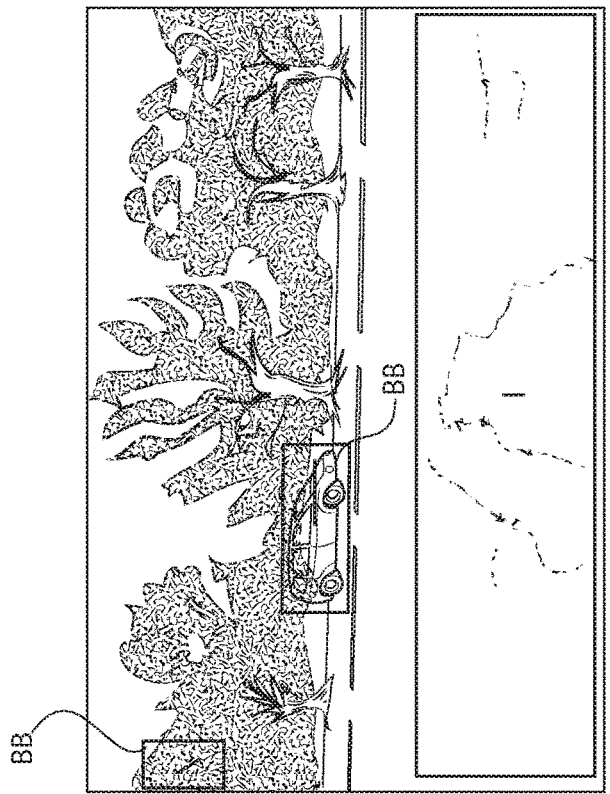

METHOD FOR ADVANCED AND LOW COST CROSS TRAFFIC ALERT, RELATED PROCESSING SYSTEM, CROSS TRAFFIC ALERT SYSTEM AND VEHICLE

PRIORITY CLAIM

This application claims the priority benefit of Italian Application for Patent No. 102016000094858, filed on Sep. 21, 2016, the disclosure of which is hereby incorporated by reference in its entirety.

TECHNICAL FIELD

The present disclosure relates to an advanced Cross Traffic Alert (CTA) method and a corresponding Cross Traffic Alert system. The Cross Traffic Alert (CTA) method is an important feature of the Automotive Advanced Driver Assistance Systems (ADAS). The Cross Traffic Alert (CTA) system is designed to alert drivers in the case in which an encroaching vehicle is detected.

BACKGROUND

In the last decade, automotive companies have significantly invested in innovation concerning many aspects of Automatic Driver Assistance Systems (ADAS). Due to the increasing attention toward automotive smart systems, much effort has been expended in terms of new hardware and software equipment.

For example, modern cars may use back, forward and/or side cameras for different purposes. Some of the most popular applications are, for example: Cross Traffic Alert (CTA), Lane Departure Warning (LDW), Collision Avoidance (CA) and Blind Spot Detection (BSD).

The different Advanced Driver Assistance Systems (ADAS) solutions may be used advantageously in different road scenarios. For example, the Cross Traffic Alert (CTA) may be useful in city road environments where other vehicles can cross the road. Conversely, Lane Departure Warning (LDW) or Blind Spot Detection (BSD) may be useful on highways where the car reaches high speeds and a brief distraction of the driver can lead to an accident.

Therefore, a wide range of advanced technologies are currently being introduced into production automobiles, with investments being made in terms of innovation about many aspects regarding Advanced Driver Assistance Systems (ADAS).

As said before, an Advanced Driver Assistance System (ADAS) is a vehicle control system that uses environment sensors (for example, radar, laser, vision, image camera) and the processing of environment information to improve traffic safety by assisting the driver in recognizing and reacting to potentially dangerous traffic situations.

Different types of intelligent vehicle assistance systems are used in driver information systems, for example:
- advanced route navigation systems, as described in: S. Jeong, T. Kim, J. Lee, S. Lee and J. Lee, "Design analysis of precision Navigation System", 12th International Conference on Control, Automation and Systems (ICCAS), 2012 (incorporated by reference);
- driver warning systems, like Lane Departure Warning (LWD) systems, as described in: T. Aung and M. H. Zaw, "Video Based Lane Departure Warning System", International Conference on Advances in Engineering and Technology, 2014 (incorporated by reference);
- Collision Avoidance (CA), an example of which is disclosed in: A. Choudhary, Y. Moon and R. Nawkhare, "Design and Implementation of Wireless Security System in Vehicle", International Journal of Innovative Research in Computer and Communication Engineering, 2015 (incorporated by reference);
- Blind Spot Detection (BSD), like the solution described in: B. F. Wu, C. C. Kao, Y. F. Li and M. Y. Tsai, "A Real-Time Embedded Blind Spot Safety Assistance System", International Journal of Vehicular Technology, 2012 (incorporated by reference); and
- intervening systems, like Adaptive Cruise Control (ACC), an example of which is described in: P. Shakouri, J. Czeczot and A. Ordys, "Adaptive Cruise Control System using Balance-Based Adaptive Control technique", 17th International Conference on Methods and Models in Automation and Robotics (MMAR), 2012 (incorporated by reference).

In particular, the driver warning systems actively warn the driver of a potential danger, allowing the driver to take appropriate corrective actions in order to mitigate or completely avoid the dangerous event.

Among these systems, in addition to the security aid, Cross Traffic Alert (CTA) is an important system to reduce the stress felt by the driver, as disclosed in the document: B. Reimer, B. Mehler and J. F. Coughlin, "An Evaluation of Driver Reactions to New Vehicle Parking Assist Technologies Developed to Reduce Driver Stress", New England University Transportation Center, White Paper, 2010 (incorporated by reference).

All of these systems are designed to alert drivers, for example with acoustic warning signal sounds, of the presence of encroaching vehicles. This warning can be useful in different situations, like backing out of parking spaces, and/or slowly arriving/leaving to traffic lights or crossroads.

A physical limitation of the Cross Traffic Alert (CTA) system is that the sensors cannot reveal obstructing objects or vehicles in the scene, so in this case cannot properly work.

The Cross Traffic Alert (CTA) system requires efficient algorithms and methods for real-time processing of the information collected. A range sensor mounted on the vehicle could provide a practical solution to the problem.

Typically a radar sensor, or both radar and image sensors, have been proposed for this purpose, as described for example in United States Patent Application Publication Nos. 2014/0015693 and 2011/0133917 (both incorporated by reference).

These known systems achieve good performance, but they are too expensive to enter the automotive mass market.

Moreover, interesting approaches to the problem are the data fusion techniques, which combine information from several sensors in order to provide a complete view of the environment.

Furthermore, different well performing approaches have also been proposed, like image infrared and visible light sensors, as described for example in: J. Thomanek and G. Wanielik, "A new pixel-based fusion framework to enhance object detection in automotive applications", 17th International Conference on Information Fusion (FUSION), 2014 (incorporated by reference), and object detection sensor (radar or camera), and in-vehicle sensor (for example for steering wheel and speedometer) as disclosed in United States Patent Application Publication No. 2008/0306666 (incorporated by reference).

Unfortunately, these less expensive systems are still too costly to be suitable for a potential automotive mass market.

Since the need is felt for very low-cost systems, the attention has been focused only to the use of a single low cost image camera.

In the art, different approaches, based on a single low cost image camera, have been proposed:

- histogram back-projection based road-plane segmentation, based on saturation and value channels of the video as described in: R. Tan, "A safety concept for camera based ADAS based on multicore MCU", IEEE International Conference on Vehicular Electronics and Safety (ICVES), 2014 (incorporated by reference);
- video based size and position of the vehicle, as described in: E. Dagan, O. Mano, G. P. Stein and A. Shashua, "Forward collision warning with a single camera", IEEE Intelligent Vehicles Symposium, 2004 (incorporated by reference);
- vehicle detection based on Haar and Adaboost and camera calibration, as described in J. Cui, F. Liu, Z. Li and Z. Jia, "Vehicle Localisation Using a Single Camera", IEEE Intelligent Vehicles Symposium, 2010 (incorporated by reference);
- Bayes classifier and shadow detection with symmetry-based approach, as described in: Y. Jheng, Y. Yen and T. Sun, "A symmetry-based forward vehicle detection and collision warning system on Android smartphone", IEEE International Conference on Consumer Electronics—Taiwan (ICCE-TW), 2015 (incorporated by reference);
- Haar-like feature and Adaboost classifier, together with Support Vector Machine (SVM) classifier with Histogram of Oriented Gradients (HOG) feature as disclosed in: Y. Deng, H. Liang, Z. Wang and J. Huang, "An integrated forward collision warning system based on monocular vision", IEEE International Conference on Robotics and Biomimetics (ROBIO), 2014 (incorporated by reference);
- SVM classifier as disclosed in: E. Salari and D. Ouyang, "Camera-based Forward Collision and lane departure warning systems using SVM", IEEE 56th International Midwest Symposium on Circuits and Systems (MWSCAS), 2013 (incorporated by reference), and so on.

At the system level, these approaches are typically based on a combination of an image sensor and an image processor, as described for example in: United States Patent Application Publication No. 2010/0201508 (incorporated by reference), and usually on Engine Control Unit (ECU) with multi-core (Micro Controller Unit) MCU as described by: V. Balisavira and V. K. Pandey, "Real-time Object Detection by Road Plane Segmentation Technique for ADAS", Eighth International Conference on Signal Image Technology and Internet Based Systems (SITIS), 2012 (incorporated by reference) to intensively elaborate the image data.

The main drawbacks of the cited prior art techniques are the need of at least an external Image Processor for heavy computation on the image data and the need of in-vehicle sensor (gear status, vehicle speed) to refine the results.

There is accordingly a need in the art to provide solutions for low cost Cross Traffic Alert method and system.

SUMMARY

A Cross Traffic Alert method is designed to alert drivers in the case in which encroaching vehicles are detected. This method is effective in different situations, like backing out of parking spaces and/or slowly arriving/leaving to traffic lights or crossroads. Many automotive companies (like Volvo, Toyota, Ford and so on) have implemented this method for the high-end market.

However, an embodiment herein is focused on a low-cost Cross Traffic Alert system to address the automotive mass market.

According to one or more embodiments, a Cross Traffic Alert method is presented.

In particular, the proposed solution for a Cross Traffic Alert method is based on a low cost camera and is entirely based on the processing of the Optical Flow (OF) data.

The method reaches high performance just using Optical Flow (OF) data.

In one or more embodiments, the method further comprises the steps of:

- filtering the Optical Flow according to the orientation, and selecting only the Motion Vectors laying on the road in order to form a reduced set;
- calculating the Vanishing Point (VP) for each frame as the average position of all intersections among lines generated by directions of Motion Vectors belonging to the reduced set;
- checking the Vanishing Point and estimating the Vanishing Point position in the current frame;
- overlying a grid over the image if the Vanishing Point position of the current frame belongs to the central area of the grid; and
- calculating the arithmetic media between the valid Vanishing Point positions relative to subsequent frames.

Additionally, in one or more embodiments for calculating a Horizontal Filter subset comprises the steps of:

- checking the Bound Box list and maintaining in said subset the Motion Vectors inside the previous calculated Bound Box List;
- performing an Horizontal Check wherein the Motion Vectors outside the previous calculated Bound Box List are checked and the horizontal Motion Vectors MVs are filtered and if the Motion Vector is considered Horizontal in maintained in the subset, and otherwise is discarded.

BRIEF DESCRIPTION OF THE DRAWINGS

Embodiments of the present disclosure will now be described with reference to the annexed drawings, which are provided purely by way of non-limiting example and in which:

FIGS. 7A, 7B, 8A, 8B, 9A and 9B are example of outputs, respectively of the Clustering step and of the Cross Traffic Alert system.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In particular, the Cross Traffic Alert (CTA) system is able to detect vehicles that move into the vehicle driving path from the left side or from the right side.

The camera that acquires an image of the surrounding area is supposed to be not only on a vehicle that is still, for example, stopped at a traffic light or at a road intersection, but also moving slowly, for example, in a car park zone.

Since a growing numbers of companies produce image sensors with hardware implemented Optical Flow (OF) analysis, as disclosed in: A. A. Stocker and R. J. Douglas, "Analog integrated 2-D optical flow sensor with programmable pixels", Proceedings of the 2004 International Symposium on Circuits and Systems (ISCAS), 2004 (incorporated by reference), the Cross Traffic Alert (CTA) system here described can work directly in the Image Signal Processor (ISP), internal to the image camera, avoiding to overload the Engine Control Unit (ECU) and avoiding to transmit the entire image flow, without the need to have an external image processor.

This solution allows for obtaining a real time Cross Traffic Alert (CTA) system with low extra computational effort, offering good performance.

Figure 1:
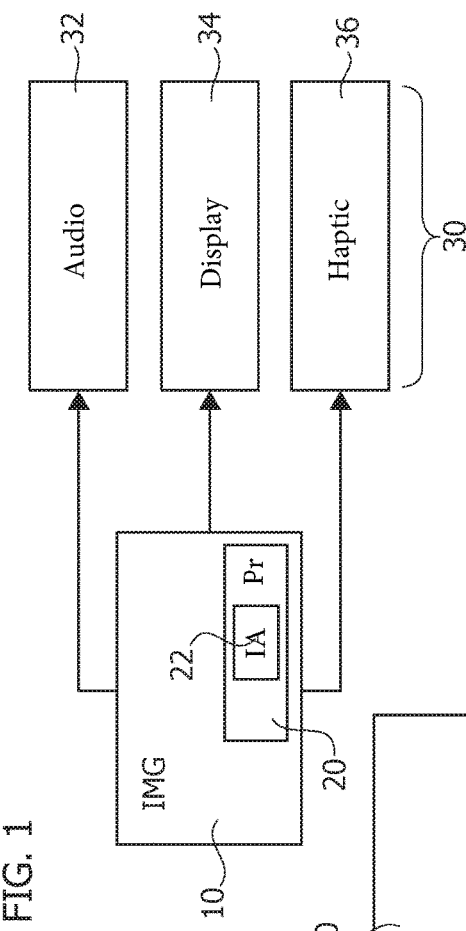
FIG. 1 shows an embodiment of a system for the Cross Traffic Alert in accordance with the present disclosure.

FIG. 1 shows a possible solution for a low-cost Cross Traffic Alert (CTA) system.

As mentioned before, the Cross Traffic Alert (CTA) system can work directly in the Image Signal Processor (ISP) of the Camera, without the need to have an external Image Processor.

In the example considered, at least one image camera 10 generating an image IMG is placed on a vehicle, such as a car, a truck or a motorcycle. The image camera 10 is placed on the vehicle and is configured to monitor the front, the back and/or the lateral road situation with respect to the vehicle.

The image camera 10 comprises a processing module (Pr) 20, for example a system for the Cross Traffic Alert analysis and the generation of an alert, that is adapted to analyze the road situation and produce an alert to the driver under some circumstances.

A typical detection system may therefore comprise a camera 10, a processing module 20 and an alert device 30, such as a visual display 34, an acoustic element 32 and/or a haptic actuator 36. Therefore, the alert given to the driver can be of one or more different types.

In particular, the haptic or kinesthetic communication recreates the sense of touch by applying forces, vibrations, or motions to the user, and in particular on the steering wheel of the vehicle.

In various embodiments of the present disclosure, the alert can be the sum or the mixing of the acoustic, the visible and the haptic alert.

Figure 7A:
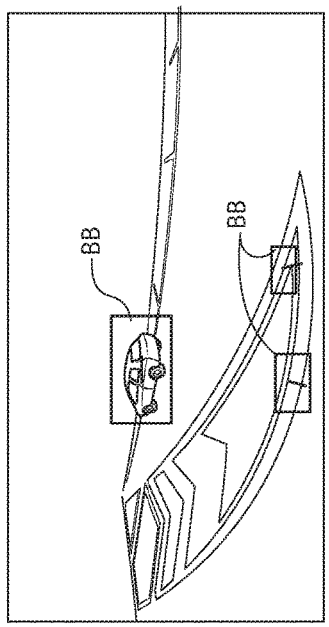

In the embodiment considered, for example, the Cross Traffic Alert (CTA) system generates an output video showing the input scene where the detected vehicles or moving objects are surrounded by a Bounding Box BB (see, for example, FIG. 7A).

In particular, the Cross Traffic Alert (CTA) processing module 20 is entirely based on the Optical Flow (OF), for example, the collection of Motion Vectors (MVs) indicating the motion of a feature in the current frame compared with the same feature in the previous frame.

The Optical Flow (OF) is computed directly inside the Image Signal Processor (ISP) of the camera 10, for example by the image processing module 20, ensuring a real time processing.

More to the point, the Cross Traffic Alert (CTA) system uses only the Optical Flow (OF) available from sensors/ISP (for example, by the new device sensor STV0991).

Moreover, the sensor device STV0991 is an image signal processor with hardware accelerators for video analytics (i.e., Optical Flow and Line Detector) working in parallel with embedded video encoders. A 500 MHz ARM based CPU, an H264 video encoder and a small rendering engine enable real time applications. The Cross Traffic Alert (CTA) procedure runs on STV0991 CPU exploiting its embedded video analytics HW accelerator. In particular, only the Optical Flow is used.

Moreover, as mentioned before, the Cross Traffic Alert (CTA) system does not need the image content, allowing to reduce the power consumption and the processor requirements, because it can work directly in a low resource system, i.e. directly in the Image Signal Processor (ISP) of the camera 10.

This can avoid to overload the Engine Control Unit (ECU) and to transmit the entire image flow between the different modules of the system.

The processing module 20 comprises a first image analysis (IA) module 22 configured to analyze the images IMG provided by the camera 10 in order to generate Optical Flow data OF. For example, in various embodiments, the Optical Flow data OF include a collection/list of Motion Vectors (MV) indicating the motion of respective features in the current image/frame compared with the previous image/frame. The Optical Flow data OF are computed in hardware, thereby permitting a real time processing with, for example, 30 fps.

Commonly, the computation of Optical Flow data OF, in particular of Motion Vectors, is well known in the art, rendering a more detailed description herein unnecessary.

In the embodiment considered, the Cross Traffic Alert (CTA) processing module 20 receives the Optical Flow data OF, for example, the motion vectors MV, having been estimated by the image analysis module 22.

Figure 2:
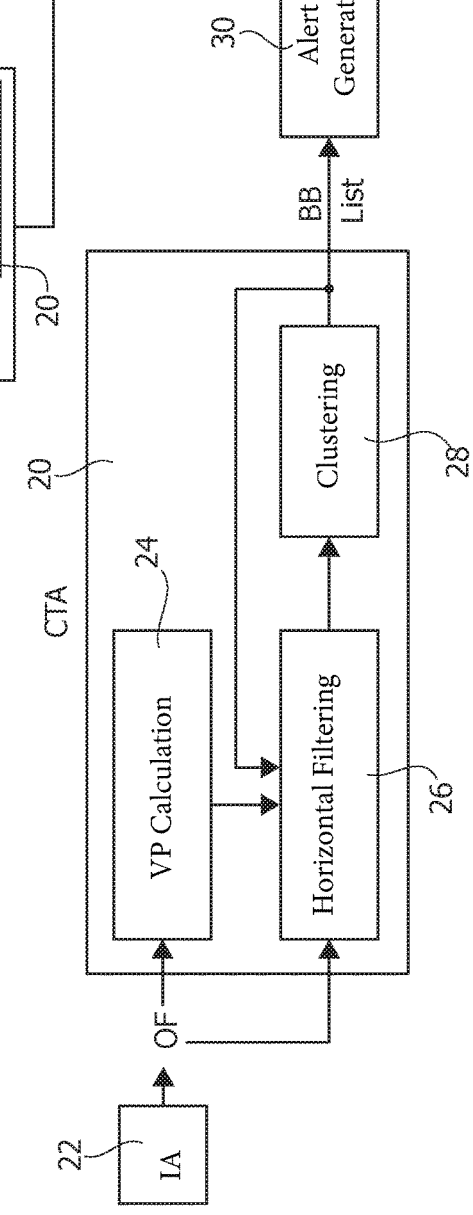
FIG. 2 shows an embodiment of the Cross Traffic Alert method steps in accordance with the present disclosure.

In one or more embodiments as exemplified in FIG. 2, the processing module 20 executes the following steps of a Cross Traffic Alert (CTA) procedure:

calculating in a vanishing point calculation module 24 the Vanishing Point (VP) starting from the Optical Flow data OP estimated by the module 22; this step takes in input the Optical Flow data OF, and calculates the Vanishing Point VP, for example, as the mean point of all intersections of straight lines passing through zoom vectors (vectors lying in the road);

calculating in a horizontal filtering module 26 the Horizontal Filter OF' subset; taking into account the Vanishing Point VP calculated in the module 24 and the Bound Box BB List of a previous frame (received in input as a feedback reaction); filtering from the total Optical Flow OF of the horizontal Motion Vectors MVs, and obtaining a subset of Optical Flow OF, called the OF' subset;

in a Clustering module 28 the subset OF' of Optical Flow is clustered and the Bound Box BB List is generated and sent to the Alert Generation device 30; from the subset OF' taken out from the Optical Flow OF, moving objects in a scene are retrieved, assuming a stationary camera, and a BB List is generated as output.

The aforementioned steps will be described in more in detail in the following subparagraphs:

First of all, the processing module 20 calculates the Vanishing Point VP using the Vanishing Point calculation module 24.

One of the most useful information for the scene understanding is the position of the Vanishing Point VP. From a theoretical point of view, the Vanishing Point VP position into the scene overlaps the center of the image only in a case of an ideal situation: a road perfectly planar (no slopes and no curves), a forward camera placed horizontally to the ground (no tilt angle) and perpendicularly to the main car axis (no pan angle).

The real case (this is the target scenario for the proposed application) presents camera calibration parameters different from zero (for example, tilt and pan angles) and, mainly, the host car crosses through roads which can have slopes and curves.

Therefore, in a real environment, the Vanishing Point VP position does not coincide with the center of the image and for this reason it is estimated.

In one or more embodiments, the Vanishing Point VP position is important not only because delimits the horizon of the scene, but also because it contributes to the selection of the Motion Vectors MVs potentially belonging to a crossing vehicle in the next Horizontal Filter sub-block.

In one or more embodiments the Vanishing Point VP is computed using only the OF.

Figure 3:
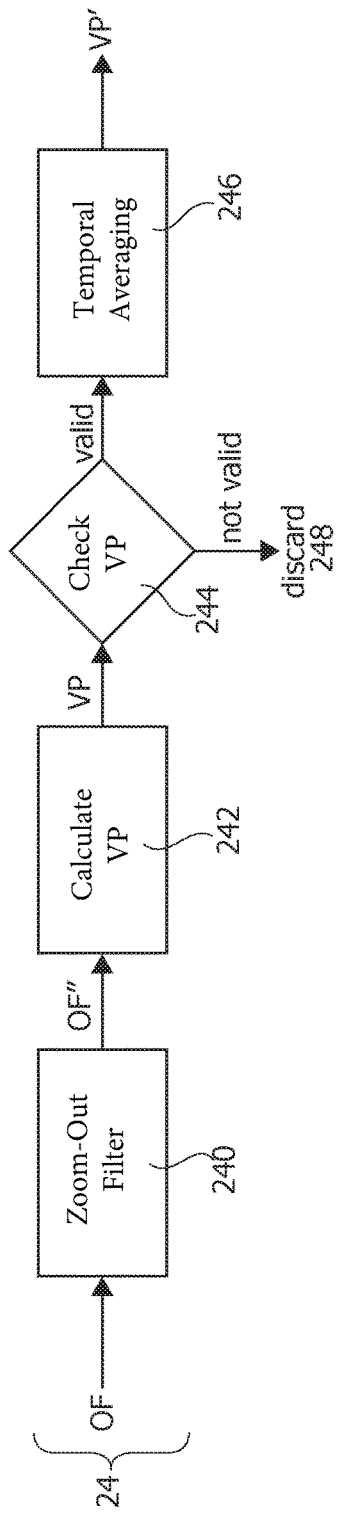
FIGS. 3 and 4 show an example of a possible implementation of some details of the method steps of FIG. 2.

Some or all of the processing steps of the procedure performed by the Vanishing Point calculation module 24 are exemplified in FIG. 3. The steps can be synthetized as follows:

in a step 240 the Optical Flow OF received in input by the module 24 is filtered in a Zoom-out filter module 240; according to the orientation, only the Motion Vectors MVs laying on the road are selected and collected in order and constituting a reduced set indicated by OF'';

in a step 242 the Vanishing Point VP is calculated for each frame as the average position of all intersections among lines generated by directions of Motion Vectors MVs belonging to the reduced set OF''; the output of this step 242 is the Vanishing Point VP; see, for example, U.S. Pat. No. 5,777,690 (incorporated by reference);

in a step 244 the Vanishing Point VP is checked; the Vanishing Point VP position estimated in the current frame will contribute to the Vanishing Point VP temporal position estimation only if it passes a specific check; a 3×3 grid overlies over the image, if the Vanishing Point VP position of the current frame belongs to the central area of that grid, then it will be used for the temporal average, otherwise it will be discarded in a step 248;

in a step 246 the validated Vanishing Point VP position is submitted to a Temporal Averaging; the arithmetic media between the valid Vanishing Point VP positions relative to subsequent frames is calculated; see, for example, German Application for Patent No. DE102014209137; due to the presence of an outlier in the zoom-out set OF'', the subsequent Vanishing Point VP positions can be slightly different; the temporal approach allows smoothing of these differences ensuring a more reliable and steady Vanishing Point VP point; the temporal Vanishing Point VP position is initialized to the center of the image plane and it reaches its stable position in few frames (around 10 frames).

Moreover, the processing module 20 calculates the subset OF' using the Horizontal Filter module 26 and receiving in input the Optical Flow OF and the Vanishing Point VP. Furthermore, also the Bound Box BB List generated by the Clustering module 28 is received in input as a feedback reaction.

In order for the subsequent Clustering step 28 to work correctly, since it works only with a steady camera, it is important to remove the Motion Vectors MVs that are in the same direction of the vehicle movement, and thus a filtering of the horizontal Motion Vectors MVs is performed.

Therefore, the processing module 20 is configured for apply a filtering based on the Bound Box BB List of previous frame, Vanishing Point VP and Motion Vectors MVs orientations.

Figure 5:
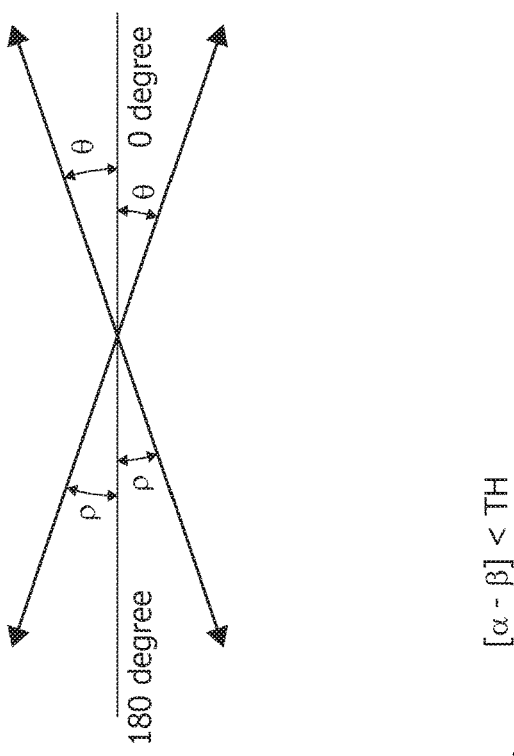
FIGS. 5 and 6 show an example of a possible implementation of some details of the steps of FIG. 4.
Figure 4:
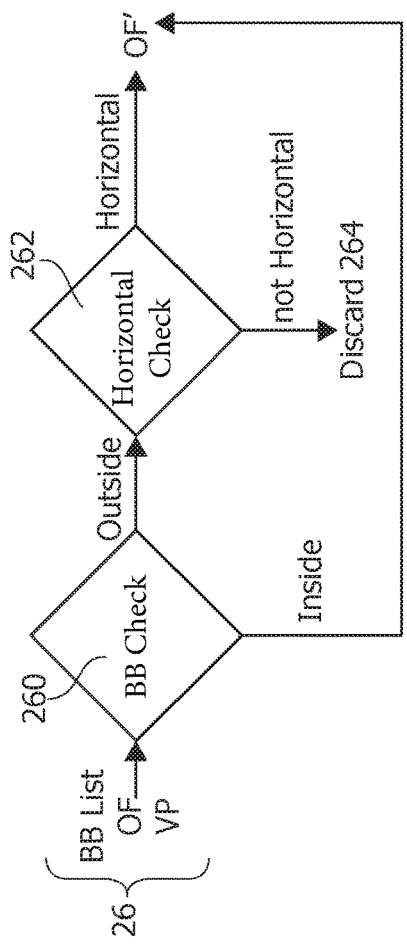
Figure 6:
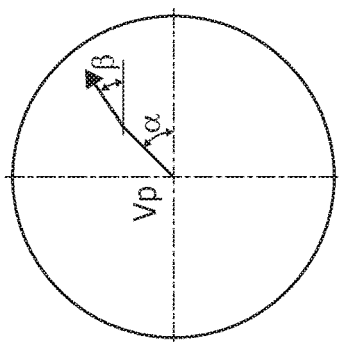

In particular, as indicated in FIG. 4, the Horizontal Filter module 26 acts according to the following steps:

BB Check step 260: the Motion Vectors MVs inside the previous calculated Bound Box BB List are preserved, and maintained in the subset OF', to avoid eliminating true clusters in the next Clustering step 28; of course, these Motion Vectors MVs can be motion compensated, assuming a constant speed in the scene; the Motion Vectors MVs in vehicles on the left side of the scene moving to the left (and vehicles on the right side of the scene moving to the right) can be easily confused with the Motion Vectors MVs to be eliminated; introducing the BB Check step 260, let to overcome the problem, assuming that vehicles on the left side of the scene moving to the left (and vehicles on the right side of the scene moving to the right) have been previously in the scene moving starting from opposite side of the scene and then previously identified by Clustering step 28;

Horizontal Check step 262: the Motion Vectors MVs outside the previous calculated Bound Box BB List are checked and the horizontal Motion Vectors MVs are filtered;

if the Motion Vector is considered Horizontal it is maintained in the subset OF', otherwise it is discarded; a vector is retained, i.e. it is considered horizontal, if two conditions are both satisfied:

1) its orientation lies around an horizontal orientation (zero or 180 degree), as indicated in FIG. 5; in the example the angle is $\theta = \rho = 10$ degree; and 2) the orientation difference between the Motion Vector MV orientation and the orientation of the Motion Vector MV translated on Vanishing Point VP overcomes an evaluated dynamic threshold TH, as indicated in FIG. 6; this dynamic threshold TH can be valuated as percentage of the difference between maximum and minimum orientation lying around the considered Motion Vector MV; in particular, for each Motion Vectors MV the neighborhood considered is set to ±1 in both directions.

In particular, the Clustering module 28 receives the subset OF' from the Horizontal Filter module 26 and calculates the Bound Box BB List.

More to the point, Clustering is the task of grouping a set of information in such a way that information in the same group (called a cluster) are more similar to each other than to those in other groups.

In this application is important to identify moving cars transversally approaching the monitored vehicle on which the Cross Traffic Alert (CTA) system is installed.

The Clustering step applied in module 28 is based, as mentioned before, only on the Optical Flow analysis, which came from the previous Horizontal Filter step 26. For example, in one or more embodiments the Clustering step 28 can be implemented as disclosed in U.S. application patent Ser. No. 15/169,232 (claiming priority to Italian Application for Patent No. 102015000082886) (incorporated by reference).

Many tests have been executed with different scenarios and different cameras at different resolutions, with both linear and fish-eye lens, obtaining very good visual results.

For real-time testing, the processing unit may comprise the STMicroelectronics device STV0991, the specific of which can be found at the internet web site http://www.st.com/web/catalog/mmc/FM132/SC51/PF255756. This device is an image processor having not only the classic pipeline to reconstruct the image from a Bayer image, but also it embeds the Optical Flow, which can be directly used as input for the cross traffic alert method.

In this image processor, there is an embedded ARM Cortex-R4 CPU @500 MHz, therefore the method can be loaded directly on it, without external host processors, having in the chip the complete solution to test "live" the behaviour of the cross traffic alert method.

Figure 7B:
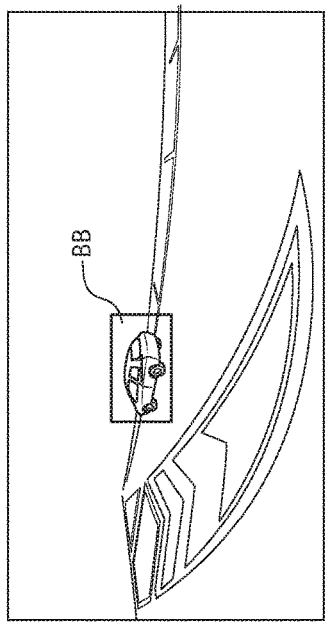

An example of Rear Cross Traffic Alert CTA with fish-eye camera is shown in FIG. 7A and FIG. 7B. In the Rear Cross Traffic Alert CTA case, the camera is mounted on the back of the vehicle and in this case the vehicle is backing out of the parking spaces.

The output of just the Clustering step 28 represented in FIG. 7A shows false Bound Boxes BBs on the ground, since the camera is mounted in a moving car and lines on the ground are moving. On the contrary, with the proposed Cross Traffic Alert CTA method, represented in FIG. 7B, the false Bound Boxes BBs are removed, since they are correctly identified and removed by the Horizontal Filter step 26.

Figure 8A:
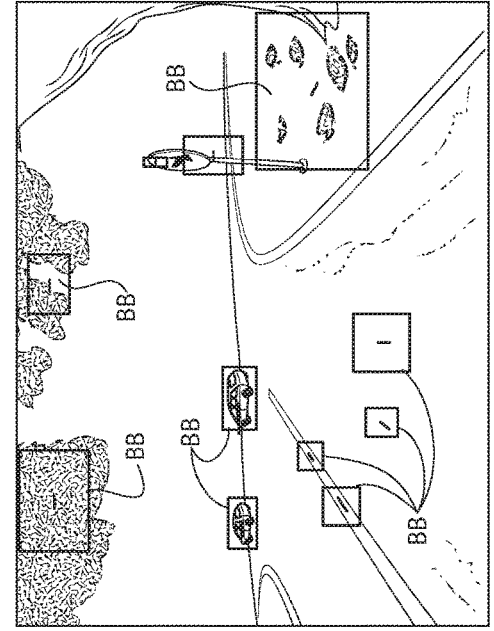
Figure 8B:
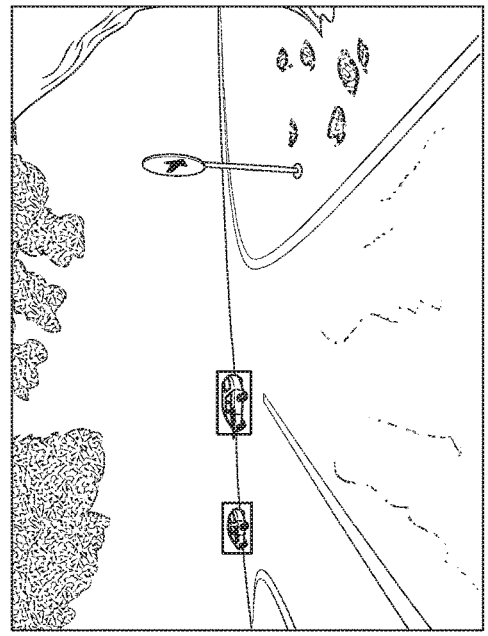

Moreover, another example of slow crossroad arriving with linear camera is shown in FIG. 8A and FIG. 8B.

In this case, the camera is mounted in front of the vehicle and the vehicle is approaching to a crossroad. The output of just the Clustering step 28, represented in FIG. 8A, shows false Bound Boxes BBs on the ground, on the leaves of trees and in the road sign.

Conversely, with the proposed Cross Traffic Alert CTA method, represented in FIG. 8B all the false Bound Boxes BBs are removed, leaving the Bound Boxes BBs of the two crossing cars.

Furthermore, another example of slow crossroad leaving with linear camera is shown in FIG. 9A and FIG. 9B.

In this case, the camera is mounted in front of the vehicle and the vehicle is leaving a crossroad. The output of just the Clustering step 28, represented in FIG. 9A, shows false Bound Boxes BBs on the ground and on the leaves of trees.

Conversely, with the proposed Cross Traffic Alert CTA method, represented in FIG. 9B, all the false Bound Boxes BBs are removed, leaving the Bound Boxes BBs of the crossing car.

The proposed solution has been experimentally tested on a representative dataset of scenes obtaining effective results in terms of accuracy. In particular, lots of tests have been executed with different scenarios and different cameras obtaining really good visual results. For example, Linear and Fish-eye lens and different cameras and resolutions have been tested.

A very reliable and low-cost Cross Traffic Alert CTA method has been developed with the following characteristics:

is a very simple technique;
low power consumption;
no external Image Processor needed;
no additional memory requirement; and
the proposed method is very flexible, so can be used with any algorithm for Optical Flow OF, Vanishing Point VP calculation and Clustering operation.

In particular, the computation time is about 800 frame/sec for a VGA sequence on a 2.3 GHz processor (like an ARM Cortex-A15).

The system is deterministic, i.e. the same input produces always the same output.

All the Cross Traffic Alert CTA processing is inside the ISP of the Camera, and moreover for solution detectability can be used:

ad-hoc input/output stimuli,
test sequences with random small/medium noise,
test sequences with multiple objects crossing.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A method for Cross Traffic Alert, comprising:
receiving a sequence of image frames from a camera mounted on a vehicle;
processing said sequence of image frames in order to generate Optical Flow data for each image frame comprising a list of Motion Vectors which indicate motion of features in said sequence of image frames;
filtering said Optical Flow data according to orientation and selecting only those Motion Vectors for features which are laying in a road in order to form a reduced set of Motion Vectors for each image frame;
calculating an image frame Vanishing Point as an average position of all intersections of straight lines generated by directions of Motion Vectors belonging to said reduced set of Motion Vectors;
checking that the calculated image frame Vanishing Point lies within a certain area of the image frame;
averaging the calculated image frame Vanishing Points which lie within said certain area over a plurality of image frames in order to calculate a Vanishing Point;
filtering said Optical Flow data taking into account the calculated Vanishing Point and a Bound Box list from a previous image frame to generate for a current image frame a Horizontal Filter subset which includes only horizontal Motion Vectors;
clustering the Horizontal Filter subset to generate a Bound Box list for a current image frame which includes transversally approaching moving objects; and
outputting said Bound Box list for the current image frame to an Alert Generation device.

2. The method for Cross Traffic Alert according to claim 1, wherein checking comprises overlying a grid over the image to determine when a position of the image frame Vanishing Point belongs to a central area of the grid.

3. The method for Cross Traffic Alert according to claim 1, wherein filtering to generate the Horizontal Filter subset comprises:
checking the Bound Box list from the previous image frame and maintaining in said Horizontal Filter subset the Motion Vectors inside the previous calculated Bound Box List from the previous image frame;
performing a Horizontal Check wherein the Motion Vectors outside the Bound Box List from the previous image frame are checked and the horizontal Motion Vectors are filtered and if the Motion Vector is considered Horizontal it is maintained in the Horizontal Filter subset, and otherwise it is discarded.

4. The method for Cross Traffic Alert according to claim 3, wherein a Motion Vector is considered horizontal, when the following two conditions are both satisfied:
an orientation of the Motion Vector lies within a certain degree range of a horizontal orientation; and
an orientation difference between the orientation of the Motion Vector and an orientation of the Motion Vector translated on the calculated Vanishing Point exceeds a threshold.

5. The method for Cross Traffic Alert according to claim 4, wherein said threshold is a percentage of a difference between a maximum orientation and a minimum orientation of the Motion Vector.

6. The method for Cross Traffic Alert according to claim 1, further comprising generating an output video showing a scene imaged by the camera where each moving object from said Bound Box list for the current image frame is surrounded by a Bounding Box.

7. A method for Cross Traffic Alert, comprising:
receiving a sequence of image frames from a camera mounted on a vehicle;
processing said sequence of image frames in order to generate Optical Flow data for each image frame comprising Motion Vectors indicating the motion of features in a current image frame compared with same features in a previous image frame;
filtering said Optical Flow data, as a function of an orientation of each Motion Vector, to generate a reduced set of Optical Flow data comprising Motion Vectors for only the features which are lying in a road;
calculating a Vanishing Point which is a mean point of intersections of straight lines passing through the Motion Vectors of the reduced set of Optical Flow data;
calculating a Horizontal Filter subset by:
receiving a Bound Box list of a previous image frame;
checking the Bound Box list of the previous image frame and maintaining in an Optical Flow data subset the Motion Vectors of the Bound Box list of the previous image frame; and
performing a Horizontal Check wherein the Motion Vectors outside the Bound Box list of the previous image frame are checked to identify horizontal Motion Vectors to be maintained in the Optical Flow data subset, wherein the Motion Vector is considered horizontal, when the following two conditions are both satisfied:
an orientation of the Motion Vector lies within a certain degree range of a horizontal orientation; and
an orientation difference between the orientation of the Motion Vector and an orientation of the Motion Vector translated on the calculated Vanishing Point exceeds a threshold;
clustering the Horizontal Filter subset to generate the Bound Box list for a current image frame which includes transversally approaching moving objects; and
outputting said Bound Box list for the current image frame to an Alert Generation device.

8. The method for Cross Traffic Alert according to claim 7, further comprising generating an output video showing a scene imaged by the camera where each moving object from said Bound Box list is surrounded by a Bounding Box.

9. The method for Cross Traffic Alert according to claim 7, wherein calculating the Vanishing Point comprises:
calculating an image frame Vanishing Point for each image frame;
checking that that calculated image frame Vanishing Point lies within a certain area of the image frame; and
averaging the calculated image frame Vanishing Points which lie within said certain area over a plurality of image frames in order to calculate the Vanishing Point.

10. The method for Cross Traffic Alert according to claim 9, wherein checking comprises overlying a grid over the image to determine when a position of the image frame Vanishing Point belongs to a central area of the grid.

11. The method for Cross Traffic Alert according to claim 7, wherein said threshold is a percentage of a difference between a maximum orientation and a minimum orientation of the considered Motion Vector.

* * * * *

UNITED STATES PATENT AND TRADEMARK OFFICE
CERTIFICATE OF CORRECTION

PATENT NO. : 10,242,272 B2
APPLICATION NO. : 15/471138
DATED : March 26, 2019
INVENTOR(S) : Giuseppe Spampinato et al.

Page 1 of 1

It is certified that error appears in the above-identified patent and that said Letters Patent is hereby corrected as shown below:

In the Claims

At Column 11, Claim No. 3, Line number 6, please delete the words "previous calculated".

Signed and Sealed this
Twenty-fourth Day of December, 2019

Andrei Iancu
*Director of the United States Patent and Trademark Office*